United States Patent
Lotz

[11] 4,014,622
[45] Mar. 29, 1977

[54] REAMER

[76] Inventor: Robert E. Lotz, c/o Aboton Machine & Tool Co., Inc., 727 Mount Ave., North Babylon, N.Y. 11704

[22] Filed: Oct. 24, 1975

[21] Appl. No.: 625,766

[52] U.S. Cl. .............................. 408/127; 10/89 F; 279/1 Q; 279/16; 408/226; 408/714
[51] Int. Cl.² ........................................ B23B 31/08
[58] Field of Search .......... 408/127, 139, 226, 229, 408/239, 714; 10/141 H, 89 F, 107 F; 279/1 A, 1 Q, 16, 9 R; 145/61 E, 61 EA

[56] References Cited
UNITED STATES PATENTS

| 2,767,564 | 10/1956 | Green | 279/16 |
| 3,371,364 | 3/1968 | Johnson | 10/89 H X |
| 3,553,753 | 1/1971 | Hundley | 10/141 H |
| 3,604,035 | 9/1971 | Hendricks | 10/141 H X |
| 3,945,751 | 3/1976 | Johnson | 408/127 |

Primary Examiner—Othell M. Simpson
Assistant Examiner—Z. R. Bilinsky
Attorney, Agent, or Firm—Bauer, Amer & King

[57] ABSTRACT

A reamer held in its required non-rotative condition for effective reaming by a rearwardly disposed key and key way construction, and wherein an elastomeric ring in encircling relation about the reamer maintains, without adverse effect on the holding function of the key and key way, the key in a clearance position within its cooperating key way, to thereby permit adjusting movements in the reamer to correct for misalignment between the reamer and the drilled hole to be reamed.

3 Claims, 6 Drawing Figures

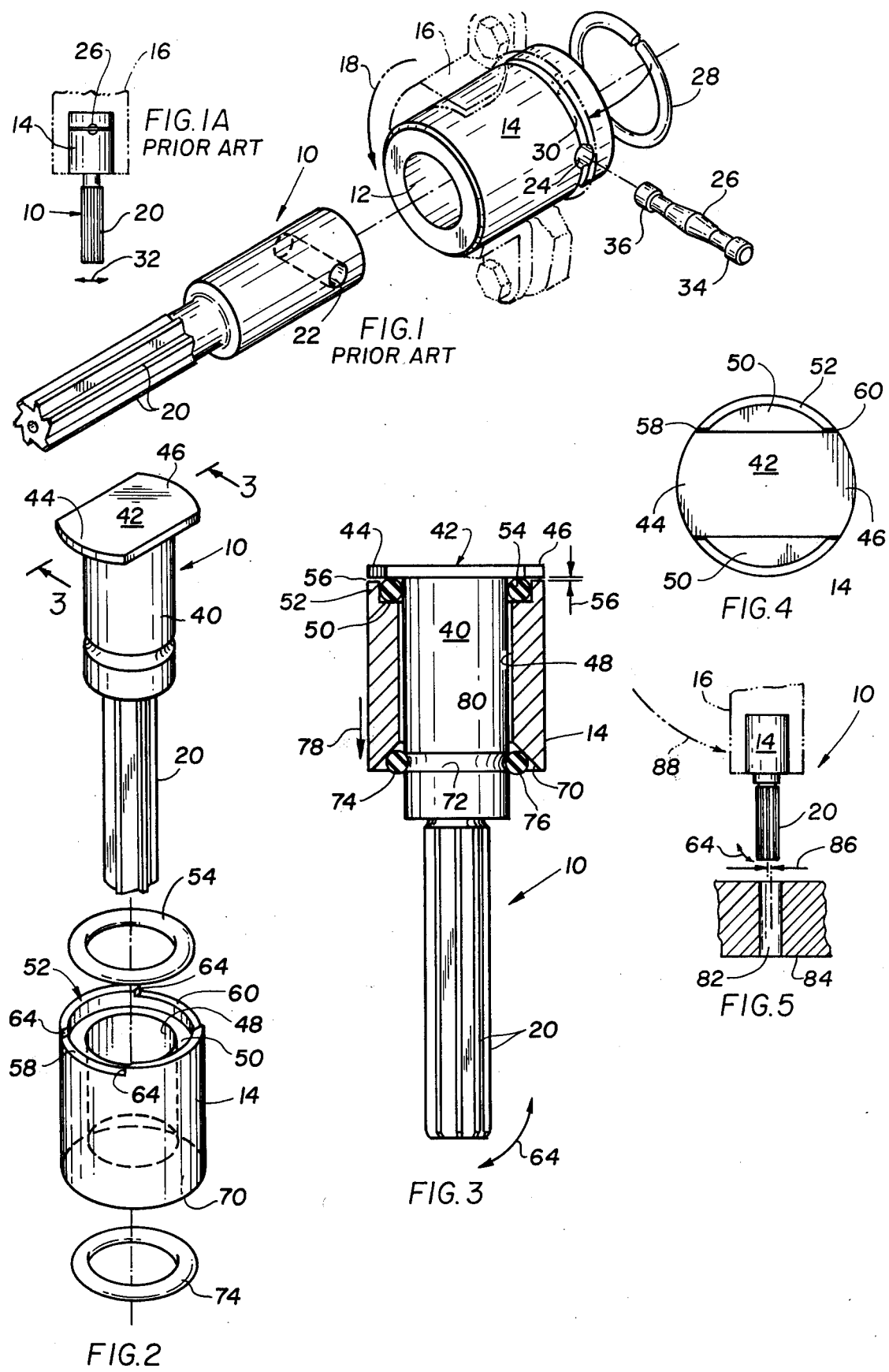

REAMER

The present invention relates generally to an improved so-called "floating" reamer, and more particularly to an improved construction in a reamer which during reaming service has a controlled degree of movement for adjusting its position relative to the drilled hole, thereby obviating any adverse effect due to misalignment between the reamer and the drilled hole.

In many machine shops, the use of old reamers and other machine tools cannot be avoided. It is generally known that the indexing movement of the turret of old or used equipment cannot be accurately controlled, and that this causes misalignment between the reamer mounted in the turret and the work piece mounted in the live spindle. As a prior art solution to this "misalignment" problem, a torque pin is used to interconnect the reamer body and its outer housing or bushing, with the expectation that pivotal movement of the body relative to the bushing about said pin will permit position correction of the reamer and thus obviate the misalignment problem. In practice, however, the force exerted on the reamer seats the pin so firmly in the curvature of the bores accommodating the same that pivotal movement about the pin, i.e. rotative movement of the bore surfaces about the pin, is non-existent for all practical purposes.

Broadly, it is an object of the present invention to provide an improved "floating" reamer overcoming the foregoing and other shortcomings of the prior art. Specifically, it is an object to movably mount a reamer within its cooperating bushing such that even under extreme force, as occurs during reaming service, the degree of movement in the reamer still exists, and is therefore still available to assist in repositioning the reamer relative to the drilled hole to eliminate misalignment therebetween.

An improved reamer having a cylindrical bushing and a select extent of relative movement while operatively mounted in said bushing during reaming service, which demonstrates objects and advantages of the present invention, includes an elongated reamer body adapted to be projected through a central bore of its cylindrical bushing. A key extending laterally of one end of the reamer body is provided to limit the projecting movement of the reamer body relative to said cylindrical bushing. Said cylindrical bushing has a wall bounding a counterbore at the end thereof adjacent said key forming a seat at said bushing end, and keyways are machined therein to cooperate with said key for holding the reamer body against rotation during reaming service thereof. Completing the reamer is an elastomeric ring mounted in encircling relation about the reamer body adjacent the key and thus having an operative position located in said seat, whereby the non-rotative reamer body nevertheless has a canting degree of movement during its reaming service which is permitted by compression of said elastomeric ring.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIGS. 1 and 1A illustrate a prior art embodiment of a "floating" reamer, FIG. 1 being a perspective view thereof and FIG. 1A a plan view.

The remaining figures illustrate an improved "floating" reamer, FIG. 2 of said remaining figures being an exploded perspective view of the various component parts of said improved reamer;

FIG. 3 is a front elevational view, in section taken on line 3—3 of FIG. 2, illustrating the improved reamer in its assembled condition;

FIG. 4 is a plan view of the improved reamer showing further structural details; and FIG. 5 is an elevational view of the reamer, on a reduced scale, illustrating how the "floating" degree of movement thereof assists in obviating any adverse effect of misalignment between the reamer and the drilled hole in the work piece requiring reaming.

As generally understood, while a reaming operation is not effective to correct an eccentricity of a drilled hole, it is intended to, and does, effectively "qualify" a drilled hole as to size and surface. Thus, in contemplation of reaming, it is a prevalent machining practice to make a drilled hole undersized by a selected amount. The amount selected depends on whether the subsequent reaming operation is to be manual or automatic. For example, if it is to be manual, then since it is under the supervision of a machine operator, the reaming operation can tolerate more chip removal and therefore it can be made undersized to a greater extent. On the other hand, if the reaming is to be by an automatic operation, then excessive chip removal must be avoided otherwise it is possible that the chips can jam between the reamer and the surface being reamed and adversely affect the finish of the surface.

Whether manual or automatic, it is desirable for a reamer to have a degree of movement during the reaming operation in order that it can better follow the drilled hole. In this connection, most machine shops are required to use old or used equipment. This type of equipment does not always have perfect concentricity between the turret hole which receives the reamer and the live spindle in which the work piece is mounted. Even more significant, the indexing movement of the turret of old or used equipment cannot in many instances be accurately controlled, with the result that the indexing movement of the turret often produces misalignment between the reamer mounted in the turret and the work piece mounted in the live spindle. This last named condition, which is exemplary of the problem that exists is illustrated by the prior art mounting of a reamer illustrated in FIGS. 1 and 1A. Briefly, illustrated in FIG. 1A is a so-called "floating" reamer, generally designated 10 which, in practice, is mounted to extend from a central bore 12 of a cylindrical housing or bushing 14. Bushing 14, in turn, is appropriately mounted in an accommodating opening in a turret 16 having indexing movement 18 which, as already noted, in many instances is ineffective to accurately align the reaming or cutting edges 20 of the tool 10 with the wall surface which bounds the drilled hole in the work piece which requires reaming or, as already noted, qualification as to size and surface. As a prior art solution to the just described "misalignment" problem, reamer 10 is mounted with a degree of "floating" movement within the bushing 14. Specifically, the cylindrical body of reamer 10 is provided with a bore 22 transversely of its longitudinal extent which aligns with throughbore 24 of bushing 14 when reamer 10 is inserted within the bushing bore 12. Following this positioning of the reamer 10, a torque pin 26 is inserted in the aligned openings 22, 24, and a circular spring 28 is then snapped in place in groove 30 to hold reamer 10 within the bushing 14.

Reamer 10 appropriately mounted within its bushing 14 is then mounted in position within the turret 16 and is supposed to have floating or pivotal movement 32 about the axis of the pin 26 to assist in eliminating the adverse consequences of misalignment between the reaming end 20 and the drilled hole of the work piece. It has been found in practice, however, that while pivotal movement 32 exists during nonreaming service of the reamer 10, it does not exist during reaming service thereof. This phenomenon is believed due to the fact that the opposite enlarged diameter ends 34, 36 of the pin 26 become firmly seated in the curvature of the opposite length portions of the throughbore 24 and, most important, also in the length portions adjacent thereto in the opposite ends of the throughbore 22. This, of course, occurs as a result of force being exerted on the cutting edges 20 as a result of the work piece revolving about these edges, and the transmission of this force through the body of the reamer 10 to the torque pin 26. Thus, it is submitted that the seating of the pin 26 in the aligned bores 22 and 24 becomes so firm that relative movement between the reamer 10 and the bushing 14 about the pin 26 is non-existent for all practical purposes.

As an improvement over the foregoing, and specifically to provide an effective "floating" reamer even during reaming service, the reamer is provided with improved structural features as illustrated in FIGS. 2–5, to which figures reference is now made. To emphasize those structural features which provide improved "floating" performance to the reamer and those structural features which are a carry-over from the conventional reamer already described in connection with FIGS. 1, 1A, the "carry-over" structural features will be identified by the same reference numbers used in connection with FIGS. 1, 1A and the new features by successively higher reference numerals.

In FIG. 2, reamer 10 has a conventional elongated shape, as illustrated, having cutting edges 20 at one end and a cylindrical body 40 at its opposite end. In the illustrated embodiment, body 40 terminates in a generally rectangular shaped member 42 which, as will subsequently be explained, functions as a key which presents two key arms 44 and 46 in laterally extending overhanging fashion relative to the cylindrical body 40.

Assembly of the reamer 10 within the bushing 14 contemplates projecting the reamer through a central throughbore 48 until further movement is prevented by the laterally extending key arms 44 and 46. In contemplation of this manner of assembly of the reamer body 40 within the bushing 14, said bushing has at one end a counterbore 50 bounded by a circular wall section 52. Counterbore 50 thus effectively serves as a seat for a ring 54 constructed of neoprene or other elastomeric material which is mounted about the cylindrical body 40 of reamer 10 and pushed up against the laterally extending key arms 44 and 46. The mounted position of ring 44 on the reamer cylindrical body 40 is clearly illustrated in FIG. 3. It will be particularly noted in FIG. 3 that the cross-section of ring 54 and counterbore 50 are sized so that the key arms 44, 46 are held at clearance distances, as at 56, relative to the end of bushing 14, the significance of which clearance positions and distances will soon be apparent.

As is perhaps best illustrated in FIGS. 2, 4, at the end of bushing 14 containing the seat or counterbore 50, wall 52 which bounds seat 50 is provided with machined notches or cut-outs 58 and 60 which serve as key ways for the key arms 44 and 46, respectively. Thus, assuming reamer 10 is in its mounted position extending from bushing 14, and as may be readily appreciated from FIG. 4, assuming that the live spindle containing the work piece is rotated in a counter clockwise direction 62 as viewed in FIG. 4, this will urge key arm 46 of key 42 into contact against the edge of wall 52 bounding cut-out 60. Once this contact is established, reamer 10 will be effectively held against rotation as the work piece is rotated about its cutting edges 20, thereby enabling effective reaming of the drilled hole.

Turning again to FIG. 3, from the description already provided it should also be readily apparent that even during reaming service that the reamer 10 has a degree of "floating" movement which assists in obviating any adverse effect of misalignment between the reaming end 20 and the drilled hole. Specifically, as illustrated in FIG. 3, since ring 54 holds the key arms 44 and 46 a clearance distance 56 from the edges bounding the respective key way notches 58 and 60, canting movements 64 are possible in the reaming end 20 to the extent permitted by the clearance 56. This "floating" movement 64 in the reaming end 20 is, of course, also permitted by compression of the elastomeric material of construction of the ring 54. In a preferred embodiment, the relative size of the cross-section of ring 54 is selected to raise the key arms 44 and 46 within the key ways 58 and 60 to provide a clearance 56 of approximately 1/32 of an inch and still permit approximately ⅛ of an inch surface contact between the longitudinally oriented edges of the notches 58, 60, individually and collectively designated 64 in FIG. 2, and the side edges of the key arms 44 and 46.

Completing the construction of the improved reamer 10 hereof, is a conical counterbore 70 approximately machined in the front end of the bushing 14, a circular groove 72 in the reamer body cylindrical portion 40, and another elastomeric ring 74. As is perhaps best shown in FIG. 3, the assembly of the reamer body within the bushing 14 contemplates also the placement of ring 74 in encircling relation about the front end of the cylindrical body portion 40 and the snapping of this ring in place within the groove 72. As a consequence, ring 74 is held in sealing contact, as at 76, against the inclined surface of conical counterbore 70. This achieves two results. First, it holds the bushing 14 from sliding disengaging movement 78 from about the reamer body 40. Second, it prevents chips removed during reaming from jamming in the clearance 80 between the reamer body 40 and the bushing surface 48 which bounds the central throughbore of the bushing.

From the foregoing description, and as illustrated in FIG. 5, the improved reamer 10 of FIGS. 2–4, has a significantly enhanced ability to properly qualify a drilled hole 82 in a work piece 84, even allowing for misalignment 86 which might result due to inaccurate control over the turret indexing movement 88 in relation to the position of the work piece 84 within the live spindle (not shown) of the reaming apparatus. This enhanced performance of the improved reamer 10 is, of course, due to the degree of canting movement 64 in the reaming end 20 which is available to make allowance for misalignment 86 even during reaming service of the improved reamer 10.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. An improved reamer having a select extent of pivotal movement during reaming service, said improved reamer comprising a cylindrical bushing having a central through bore therein terminating in opposite front and rear openings, an elongated reamer body adapted to be projected through said rear opening of said through bore of said cylindrical bushing in the direction of said front opening thereof to provide an operative mounting of said reamer within said cylindrical bushing, a key of a generally rectangular shape extending generally perpendicularly of said reamer body so as to present opposite key arms extending laterally of one end of said reamer body limiting said projecting movement of said reamer body relative to said cylindrical bushing, said cylindrical bushing having a wall bounding a counterbore at the end thereof adjacent said key forming a seat at said bushing end, said cylindrical bushing wall having two cut-outs spaced 180° apart forming key ways therein cooperating with said key for holding said reamer body against rotation during reaming service thereof, each said cut-out adapted to receive a cooperating one of said key arms, and an elastomeric ring mounted in encircling relation about said reamer body adjacent said key having an operative position located in said seat, whereby said non-rotative reamer body nevertheless has a canting degree of movement during said reaming service which is permitted by compression of said elastomeric ring.

2. An improved reamer as defined in claim 1 wherein said front end opening of said cylindrical bushing has a wall bounding a conical opening into said central through bore thereof, and an additional elastomeric ring is mounted in encircling relation about said reamer body at a location therealong so as to seat in said conical opening, whereby said additional elastomeric ring acts as a seal preventing chips removed during reaming from wedging between said reamer body and said cylindrical bushing.

3. An improved reamer as defined in claim 2 wherein said reamer body has a groove therein for holding said additional ring in position therealong, whereby said additional ring also holds said reamer body against inadvertent withdrawing movement out of said bushing.

* * * * *